(12) United States Patent
Switzer et al.

(10) Patent No.: US 7,670,988 B2
(45) Date of Patent: Mar. 2, 2010

(54) NANOSTRUCTURED ANODE PT-RU ELECTROCATALYSTS FOR DIRECT METHANOL FUEL CELLS

(75) Inventors: Elise Switzer, Albuquerque, NM (US); Plamen Atanassov, Albuquerque, NM (US); Abhaya Datye, Albuquerque, NM (US)

(73) Assignee: STC, UNM, Albuquerque, NM (US)

( * ) Notice: Subject to any disclaimer, the term of this patent is extended or adjusted under 35 U.S.C. 154(b) by 295 days.

(21) Appl. No.: 11/873,568

(22) Filed: Oct. 17, 2007

(65) Prior Publication Data

US 2009/0069175 A1      Mar. 12, 2009

Related U.S. Application Data

(60) Provisional application No. 60/852,298, filed on Oct. 17, 2006.

(51) Int. Cl.
*B01J 23/42*   (2006.01)
*B01J 23/46*   (2006.01)
*B01J 23/62*   (2006.01)

(52) U.S. Cl. .................. 502/339; 75/355; 75/361; 75/362; 75/365

(58) Field of Classification Search ............ None
See application file for complete search history.

(56) References Cited

OTHER PUBLICATIONS

"Low Temperature Preparation of Porous Metal Structure," IBM Technical Disclosure Bulletin 14(4), p. 1043, Sep. 1971.*
Choi et al., "Bimetallic Pt-Ru nanowire network for anode material in a direct-methanol fuel cell" Journal of Power Sources (2003) 420-425 vol. 24, issue 2.

* cited by examiner

*Primary Examiner*—Melvin C Mayes
*Assistant Examiner*—James Corno
(74) *Attorney, Agent, or Firm*—Gonzales Patent Services; Ellen M. Gonzales (57) ABSTRACT

An aerosol-assisted method for synthesis of nanostructured metallic electrocatalysts and the electrocatalysts formed thereby. The electrocatalyst may be formed from metals such as, but not limited to, platinum, platinum group metals, and binary and tertiary compositions thereof such as, for example, platinum-ruthenium and platinum-tin. The resulting unsupported electrocatalyst is homogenous and highly disperse.

14 Claims, 7 Drawing Sheets

NANOSTRUCTURED ANODE PT-RU ELECTROCATALYSTS FOR DIRECT METHANOL FUEL CELLS

CROSS-REFERENCE TO RELATED APPLICATIONS

The following application claims benefit of U.S. Provisional Application No. 60/852,298, filed Oct. 17, 2006, which is hereby incorporated by reference in its entirety.

STATEMENT REGARDING GOVERNMENT SPONSORED RESEARCH

This invention was made with Government support under Grant No. DAAD19-01-2-0010, awarded by the Army Research Office, under the Army Research Laboratory collaborative technology alliance project funded through Honeywell Corp. The U.S. Government has certain rights in this invention.

BACKGROUND

Fuel cells are receiving increasing attention as a viable energy-alternative. In general, fuel cells convert electrochemical energy into electrical energy in an environmentally clean and efficient manner. Fuel cells are contemplated as potential energy sources for everything from small electronics to cars and homes. In order to meet different energy requirements, there are a number of different types of fuel cells in existence today, each with varying chemistries, requirements, and uses.

As one example, Direct Methanol Fuel Cells (DMFCs) rely upon the oxidation of methanol on an electrocatalyst layer to form carbon dioxide. Water is consumed at the anode and produced at the cathode. Positive ions (H+) are transported across a proton exchange membrane to the cathode where they react with oxygen to produce water. Electrons can then be transported via an external circuit from anode to cathode providing power to external sources.

The kinetic and transport properties of the electrocatalyst and its integration into the fuel cell can have a profound effect on the efficiency and affordability of the fuel cell. The nature of the kinetic and transport properties of an electrocatalyst and its integration in the fuel cell is due in part to the hierarchical structure which combines distinct structural considerations across length-scales. On the scale of 1-10 nm, the key factors affecting activity include the crystallite size and identity of the exposed crystallite faces of the electrocatalyst. On the scale of 10-100 nm the topography of the electrocatalyst microstructure and/or electrocatalyst support are the significant elements. At this level, the transport channel for reactants and products is a direct consequence of the local structure. The local roughness at this level is associated with the surface area as well as the effective diffusivity of reactants and thus greatly influences the catalytic activity.

On the scale of 1-100 microns, the key features are of the electrocatalyst aggregates. The larger gas diffusion channels are a consequence of the agglomerated catalytic structure at this level. On the scale of 0.1-1 mm, the characteristic layer gradations of the fuel cell are apparent, namely the gas diffusion, catalytic and electrolytic membrane layers. Finally, at the scale of 1-10 mm, the fuel cell design and production irregularities become important.

Accordingly, finding novel electrocatalysts and methods for manufacturing them, can lead to significant advancement in fuel cells.

Currently, electrocatalysts can be separated into two basic types: supported electrocatalysts and unsupported electrocatalysts. Supported electrocatalysts comprise a highly dispersed metal composition or alloy such as platinum or platinum ruthenium that is supported by a carbonaceous framework. This high degree of dispersity of the metal increases the surface area of the metal, improving the efficiency of the catalytic reaction. Unsupported electrocatalyst remain attractive because they allow overcoming long-term durability issues associated with carbon support corrosion. n DMFCs, unsupported electrocatalysts have been commonly used, most usually unsupported Pt—Ru black. The amount of precious metal loading in a DMFC anode is in practice much greater than for a hydrogen fuel cell due to the greater complexity of the reaction. This cost can be sustained because the target market for DMFCs is small portable devices. An example of a commonly used unsupported electrocatalyst for DMFCs is Pt—Ru black.

One conventional method of electrocatalyst manufacture is by metallic impregnation or co-precipitation where an aqueous solution of the metallic precursor is contacted with the support substrate. (This method may be referred to herein as the "bulk" method of electrocatalysis synthesis.) After evaporation of the water, the metallic phase can be reduced under hydrogen flow for experimental use. The standard industrial method of producing fuel cell electrocatalysts is by adding a reducing agent, usually formaldehyde or formic acid, to an aqueous mixture of ionic metallic precursors which results in precipitation of the metallic electrocatalyst.

Another approach employs the synthesis of nanostructured materials and has centered on the replication of nanostructured silica templates followed by template removal. Many studies have focused on the synthesis of nanostructured carbon supports for electrocatalyst supports. Mesoporous carbon materials have been synthesized from several mesoporous silica materials. See e.g., R. Ryoo, S. H. J., M. Kruk, M. Jaroniec, Advanced Materials, 2001. 13: p. 677; and C. Yu, J. F., B. Tian, D. Zhao, G. Stucky, Advanced Materials, 2002, 14: p. 1742.

Some researchers believe that SBA-15 is the best template due to its interconnecting micropores between larger mesopores. Silica-templated mesoporous carbons with large surface areas have also been synthesized between the range of 10 nm to 10 μm depending on the choice of silica template. See e.g., Fuertes, A., Journal of Materials Chemistry, 2003. 13: p. 3085.

Various lengths and shapes of monometallic nanowires templated by various silica structures have been reported. See e.g., Bore, M., T. L. Ward, A. Fukuoka, Catalysis Letters, 2004. 98: p. 167-172; Egan, G. L., J. Yu, C. H. Kim, S. J. Lee, R. E. Schaak, T. E. Mallouk, Advanced Materials, 2001. 2: p. 1040; and H. J. Shin, C. H. K., R. Ryoo, Journal of Materials Chemistry, 2001. 11: p. 260.

Bimetallic structures templated by nanostructured silica have also been reported which include Pt—Rh and Pt—Pd nanowires. See e.g., A. Fukuoka, Y. S., S. Guan, S. Inagaki, N. Sugimoto, Y. Fukushima, K. Hirahara, S. Iijima, M. Ichikawa, Journal of the American Chemical Society, 2001. 123: p. 3373. Previous work on the synthesis of nanostructured Pt—Ru electrocatalysts includes the synthesis of a bimetallic Pt—Ru nanowire network templated by mesoporous silica, specifically SBA-15. See e.g., Choi, W. C. and S. I. Woo, Journal of Power Sources, 2003. 124(2): p. 420-425. The SBA-15 silica template is synthesized separately and is then immersed in a solution of Pt and Ru precursors. This infiltration procedure has to be repeated numerous times, usually about ten, before full pore infiltration can be accomplished See e.g., Choi et al, above. Following this approach, a significant increase in the electrocatalytic activity was found when compared to a commercial Pt—Ru black. Impregnation synthesis of a bimetallic network in mesoporous silica presents an interesting material design approach, although it is limited in application due to its complexity, parameter variability and time-consuming synthesis.

However, fuel cells employing the electrocatalysts formed by the methods described above are limited by material homogeneity and are laborious to synthesize. Accordingly, a novel electrocatalyst that can overcome or limit such inefficiencies is desirable. Specifically, it would be desirable to develop enhanced nanostructured materials that are homogeneous throughout the entire sample and which can be synthesized in a scaleable procedure.

BRIEF DESCRIPTION OF THE DRAWINGS

FIG. 4b is a close-up of a portion of the TEM micrograph of FIG. 4a.

DETAILED DESCRIPTION

According to an embodiment the present disclosure provides a novel method of fuel cell electrocatalyst manufacture. In general, a precursor solution comprising metal precursors and metal oxide particles, for example silica particles, undergo aerosol-assisted self-assembly during which they are atomized ultrasonically and subjected to pyrolysis in the presence of an inert carrier gas. The resulting powder is then collected and reduced. Finally, the silica template is removed.

Since the first ordered porous silica materials were synthesized by researchers at the Mobil Corporation, many different surfactant templates and synthesis routes have been explored. Aerosol-assisted self-assembly can be used to produce a variety of well-ordered spherical silica particles possessing stable pore structures of hexagonal and cubic form. See e.g. Y. Lu, H. F., A. Stump, T. Ward, T. Rieker, C. J. Brinker, Nature, 1999. 398: p. 223. The surfactant concentration determines the type of mesophase (hexagonal, cubic, lamellar) and the choice of surfactant can determine the pore size. The process of aerosol-assisted self assembly of mesostructured spherical silica particles has been extensively studied: a solution of surfactant and silica precursor (usually Tetraethylorthosilicate) is made, and ordered mesoporous silica is then synthesized in an aerosol reactor.

There are many advantages of synthesizing templated electrocatalyst materials by spray pyrolysis. As described in greater detail below, the final morphology and composition of the electrocatalyst is determined by the precursor solution atomized. Changing the morphology and composition of the precursor solution is extremely simple and straightforward. For alloys, the template and alloy constituent precursors are in close contact during synthesis which results in a more homogeneous final material as opposed to bulk templating methods.

Figure 1:
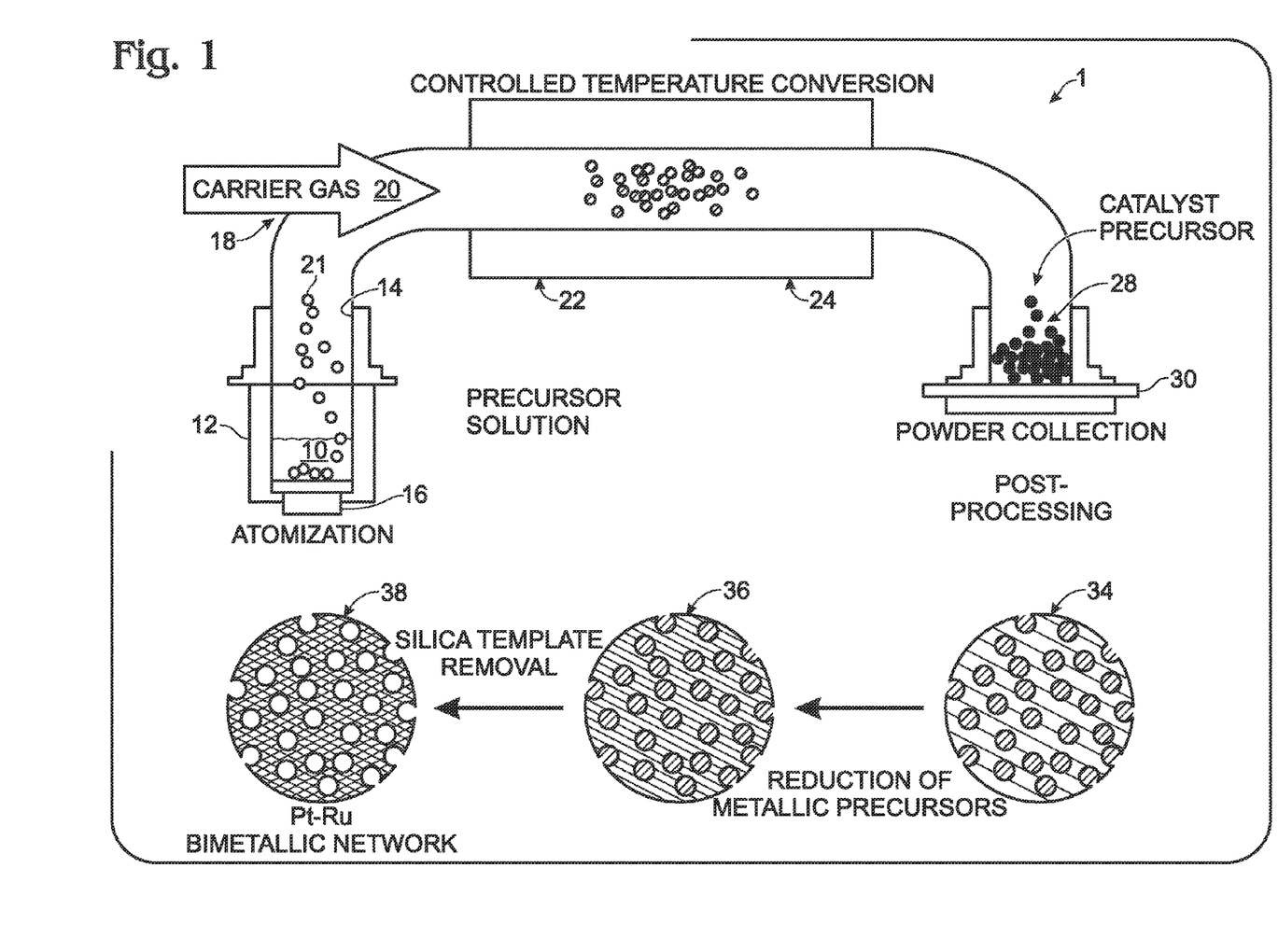
FIG. 1 depicts a method of fuel cell electrocatalyst manufacture according an embodiment of the present disclosure.

FIG. 1 depicts an exemplary aerosol reactor 1 in which the currently-described method may be performed. As shown, a precursor solution 10 may be contained within a reservoir 12, which is connected via a feed tube 14 to an atomizer 16. The atomizer includes an inlet 18 through which a carrier/atomization gas 20 may be introduced. In some embodiments, the atomizer may take the form of a commercially available humidifier. However it will be appreciated that any convention apparatus for droplet generation may be used including nebulizers, collision nebulizers, ultrasonic nebulizers, vibrating orifice aerosol generators, centrifugal atomizers, two-fluid atomizers, electrospray atomizers, etc. The resulting aerosol droplets 21 are then transported through a drying zone 22 and a heating zone 24 so as to undergo a controlled temperature conversion. In some embodiments, an inert gas, such as nitrogen, is used as the carrier gas. Other examples of suitable carrier gases include argon, helium, and other insert gases. The resulting particles for a powder 28, which is then collected, for example, on a filter 28. Of course it will be appreciated that other collection devices such as cyclones, electrostatic separators, bag filters, filter discs, and the like may be used. In some embodiments, the filter or other collection device may be heated to ensure complete drying of the powder. For example, filter 28 may be locked between disks that are wrapped with a heating coil. Once the powder is dry, it can be collected and then calcined to remove the surfactant, resulting in spherical mesoporous silica particles, as shown at 34. The metallic precursors in the resulting material 34 may then be reduced, for example under hydrogen flow to form material 36. The silica template may then be removed, for example, via exposure to a strong acid or in a strong base, resulting in an unsupported, highly dispersed network formed of a substantially homogenous material, as shown at 38. An example of a suitable acid is HF, though those of skill in the art will be familiar with a variety of acids and bases that could be used.

While a number of the examples herein discuss the formation of Pt—Ru electrocatalysts, it should be understood that the methods described herein, and the materials formed therefrom, may be utilized to form an electrocatalyst having any desired metal composition. Accordingly, in various embodiments, the precursor solution may contain one or more metal precursors, as determined by the desired composition of the resulting electrocatalyst. For example, as described in further detail below, Pt—Ru electrocatalysts are particularly useful in DMFCs, while Pt—Sn electrocatalysts may be of particular interest in Direct Ethanol Fuel Cells (DEFCs). In preferred embodiments, one or more of the metal precursors may be a precursor of platinum, platinum group metals, and binary or tertiary compositions thereof including, for example, but not limited to: platinum-tin, platinum-nickel, platinum-iridium, platinum-palladium, platinum-iron, platinum-copper, platinum-chromium, platinum-cobalt, and platinum-ruthenium-tin. In one embodiment, the metal precursors are tetraamineplatinum (II) hydroxide and hexaamineruthenium (III) chloride.

As stated above, the precursor solution also contains silica particles and, as shown, the silica particles form the template on which the electrocatalyst is formed. While in some embodiments it may be desirable for the silica particles to be monodisperse (e.g. consistently 5 nm diameter spheres), in other embodiments it may be desirable to use silica particles of varying sizes or even shapes. It should be appreciated that the size and shape of the silica particles may be selected according to the desired shape(s) and size(s) of the voids within the electrocatalyst material. Accordingly, by selecting the particular size and shape of silica particles, one can produce an electrocatalyst having voids of a predictable size and shape. For example, if the silica particles are spheres, the electrocatalyst will contain a plurality of spherical voids. Those of skill in the art will be familiar with the electrocatalyst Pt—Ru black, which consists of a plurality of platinum-ruthenium alloy particles that could be approximated with a general spherical morphology. A Pt—Ru electrocatalyst formed from using silica spheres with the above-described method looks like a negative image of the Pt—Ru black; the space that existed as a void in the Pt—Ru black is filled with metal electrocatalyst, and the space that existed as metal electrocatalyst in the Pt—Ru black is void.

As stated above, according to some embodiments, silica spheres of any diameter may be used. In some preferred embodiments, monodisperse silica spheres having an average diameter of between 1 nm and 100 nm, in more preferred embodiments, silica spheres having an average diameter of between 100 nm and 1000 nm may be used and in other preferred embodiments, silica spheres having an average diameter of between 1 μm and 100 μm may be used. In one particular embodiment, the silica template is Ludox® TM50 colloidal silica solution with monodisperse silica particles having an average diameter of 20 nm. As stated above, because the spheres serve as the template for the formation of the electrocatalyst, in an embodiment where silica particles having an average diameter of 20 nm is used, the spherical voids in the electrocatalyst will typically have a diameter of approximately 20 nm. Those of skill in the art will be familiar with a variety of silica particles that are commercially available, and such particles may be used. Alternatively, known methods of forming silica particles may be employed in order to obtain particles of the desired shape and/or size.

According to another embodiment, the present disclosure also provides a metallic electrocatalyst formed by the methods described above. As stated above, the methods described herein result in a highly disperse non-supported metallic electrocatalyst wherein porosity is engineered in a repeatable and predictable fashion. Furthermore, the methods described herein result in a higher degree of alloying than previously described in other templating methods. For example, as described in greater detail below with regard to the examples section, testing of a Pt—Ru electrocatalyst formed using the methods described herein resulted in the conclusion that the electrocatalyst was composed only of face-centered cubic (fcc) Pt—Ru allow particles. Accordingly, the electrocatalysts of the present disclosure may comprise at least 40% metal alloy, at least 50% metal alloy, at least 60% metal alloy, at least 70% metal alloy, at least 80% metal alloy, at least 90% metal alloy, at least 95% metal alloy, at least 99% metal alloy, or even 100% metal alloy. Moreover, where some other methods of templating metal electrocatalysts result in materials with a great degree of heterogeneity, the presently-described methods result in a substantially homogenous material.

A greater understanding of the various embodiments described herein will be gathered from the following examples. It should be understood that such examples are meant for purposes of illustration only and should not be considered to be limiting.

EXAMPLES

Effectiveness Factor through Modeling

Many models have been created of the fuel cell active layer to gain a greater understanding of the transport and kinetic characteristics. A particularly useful model which attempts to model the cathodic active layer at the microscopic level has been developed. See e.g. Bultel, Y., Ozil, P. and R. Durand, Journal of Applied Electrochemistry, 1999. 29: p. 1025-1033; and Bultel, Y., Ozil, P. and R. Durand, Journal of Applied Electrochemistry, 2000. 30: p. 1369-1376. This model confirms the generally accepted observation that higher porosity in the fuel cell active layer will result in higher efficiency. The models as well as experimental data shows that diffusion limits electrocatalyst utilization for both the anodic and cathodic reactions. See e.g., Gloaguen, F. and R. D., Journal of Applied Electrochemistry, 1997. 27: p. 1029. In addition, the models show the existence of local diffusion limitations at the particle level. See, e.g. Bultel, Y., Ozil, P. and R. Durand, Journal of Applied Electrochemistry, 2000. 30: p. 1369-1376.

The governing equations of the active layer are the Tafel equation (Equation 1-7), Fick's Law (Equation 1-8) and Ohm's Law (Equation 1-9) which describe electrochemical reaction, diffusion of reactant gas and ionic conduction, respectively.

$$i = i_0 \exp\left(\frac{2.3\eta}{b}\right)\frac{C}{C_0} \quad (1\text{-}7)$$

$$N = -D|grad(C)| \quad (1\text{-}8)$$

$$i_{ionic} = -\sigma|grad(V)| \quad (1\text{-}9)$$

A mass balance can be performed over the control volume consisting of the active layer which is given by Equation 1-10.

$$D\frac{\partial^2 C}{\partial z^2} - \frac{\gamma_l i_0}{nFl}\left[\exp\left(\frac{2.3|\eta|}{b}\right)\frac{C}{C_0}\right] = 0 \quad (1\text{-}10)$$

Upon non-dimensionalization of the mass balance equation for a porous catalytic layer, a dimensionless parameter U is determined and is expressed in Equation 1-11. The mass transfer resistance parameter U is similar to a Damköhler number which demonstrates the influence of diffusion mass transport compared to kinetics.

$$U = \frac{\gamma_l k l}{DC_0} \text{ where } k(n_i) = \text{kinetic rate constant} = \frac{i_0}{nF}\exp\left(\frac{2.3\eta_i}{b}\right) \quad (1\text{-}11)$$

A local roughness factor γ1 accounts for the geometry of the catalytic layer and the electrocatalyst agglomerate width is given by 1. The local roughness factor γ1 in the above equations is estimated in this model using the following relationship in Equation 1-12 where L is defined as the active layer thickness.

$$\frac{\text{Total Active Surface}}{\text{Agglomerate Volume}} = \frac{\gamma}{(L-\Theta)} = \frac{\gamma_l}{2l} \text{ where } \Theta = \text{Porosity} \quad (1\text{-}12)$$

The mass transfer parameter U is similar to the Thiele Modulus ϵ which compares the characteristic rate of reaction to the characteristic rate of diffusion and thus can be used to calculate the effectiveness factor by Equation 1-13.

$$\varepsilon = \frac{\tanh\sqrt{U}}{\sqrt{U}} \quad (1\text{-}13)$$

This effectiveness factor ϵ for a fuel cell active layer is similar to the effectiveness factor for porous electrocatalyst particles in heterogeneous catalysis. The effectiveness factor characterizes electrocatalyst utilization by comparison of current density with mass transport limitations to purely kinetic current density.

Cyclic Voltammetry (CV)

Cyclic Voltammetry (CV) is an electrochemical technique in which a potentiostat applies a gradual potential ramp to the working electrode. The potential is linearly swept through the potential range of interest and then reverses direction back through this range. During this scan, the resulting current due to the applied potential is measured by the potentiostat. It can be very useful as a screening technique to determine if a particular material is electroactive. CV is a technique that employs a rotating disk electrode (RDE) as the working electrode in a standard three electrochemical cell. The RDE is rotated to eliminate transport limitations within the liquid electrolyte. The rotation results in convective transport of reactant species to the electrode surface.

Example I

Bulk Synthesis

Figure 2A:
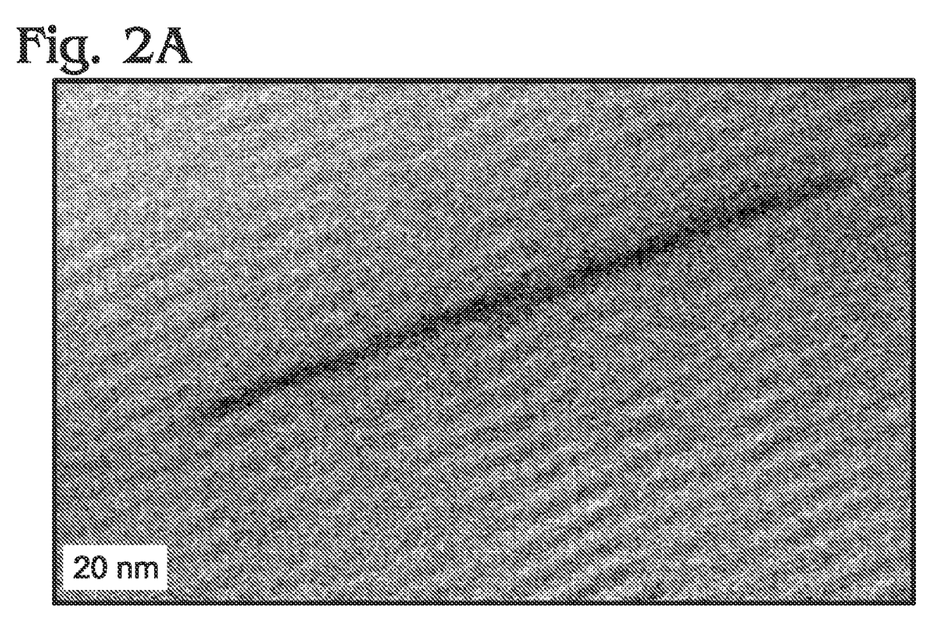
FIG. 2a is a TEM micrograph of Pt—Ru material templated by SBA-15 in a bulk synthesis process.
Figure 2B:
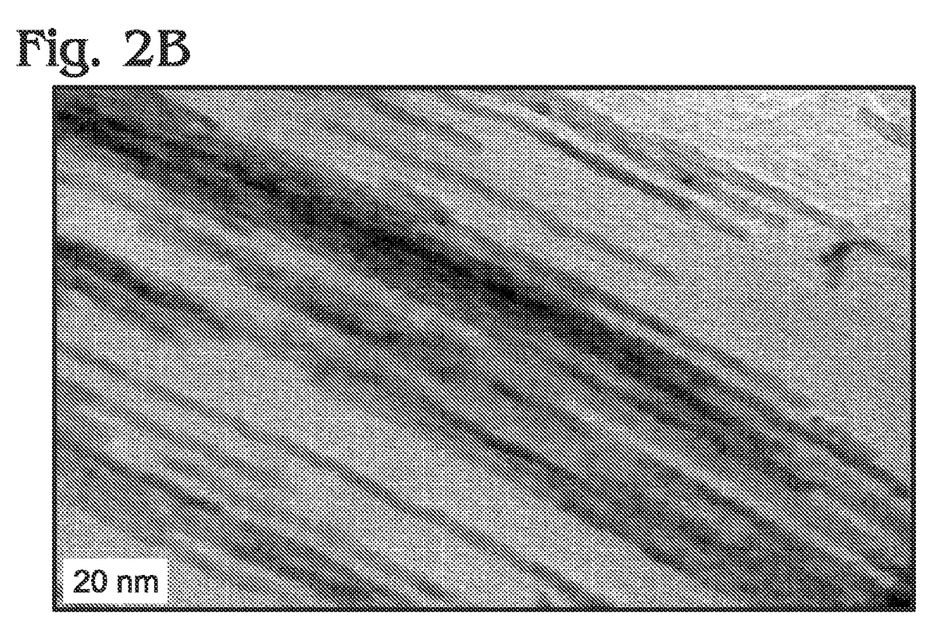
FIG. 2b is a TEM micrograph of Pt—Ru material templated by SBA-15 in a bulk synthesis process.
Figure 2C:
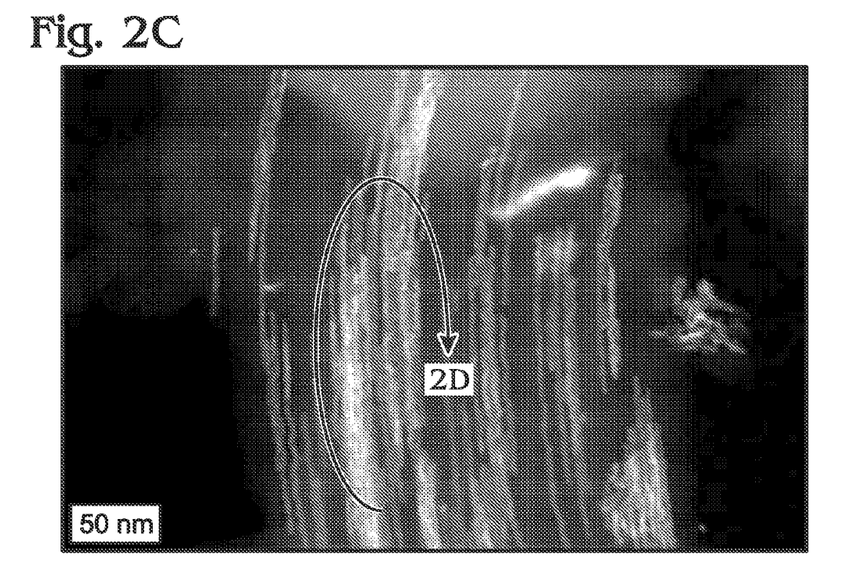
FIG. 2c is a TEM micrograph of Pt—Ru material templated by SBA-15 in a bulk synthesis process
Figure 2D:
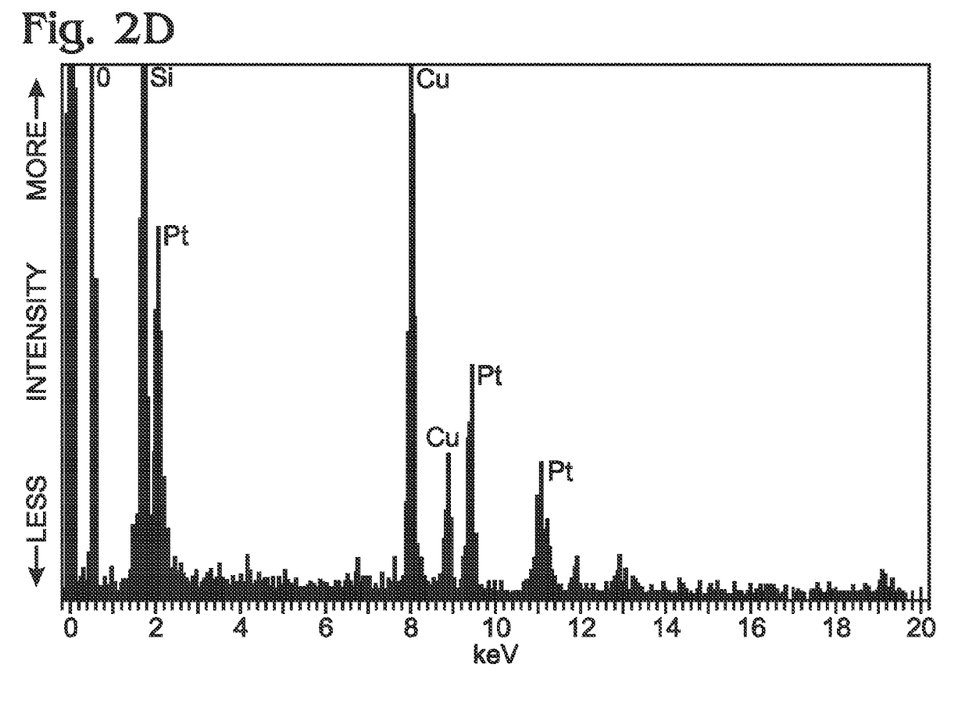
FIG. 2d is an EDS spectrum of the Pt—Ru material of FIGS. 2a-2c.

In this study, mesoporous SBA-15 silica was synthesized separately. This was followed by a one-step infiltration of the pores by a platinum and ruthenium precursors. FIGS. 2a-2c are TEM micrographs of Pt—Ru material templated by SBA-15 in a bulk synthesis process. The images show incomplete silica pore infiltration. The EDS spectrum (FIG. 2d) shows only platinum present in the particular area examined. It is evident from the TEM micrographs that the metallic phase does not fully infiltrate the pores of the silica template. In addition, the platinum and ruthenium does not form homogenously within the pores. This shows a serious drawback of the bimetallic bulk synthesis method because the catalytic activity is closely related to the degree of alloying. Again, this bulk synthesis method is not promising for creating such templated materials.

Example II

Aerosol Synthesis of Pt—Ru Nanocomposites

The aerosol synthesis procedure as shown in FIG. 1 was used. The precursor solution consisted of tetraamineplatinum (II) hydroxide, hexaamineruthenium (III) chloride and Ludox® TM50 colloidal silica solution with monodisperse silica particles having an average diameter of 20 nm. Alternative formulations of the metallic precursor/silica template ratio in the precursor solution were investigated. The materials discussed here varied in the metallic precursors/silica template ratio in the aerosol precursor solution. This ratio was 50 wt % PtRu/SiO2 for the Aerosol Low Metal Loading (LML) sample, 70 wt % PtRu/SiO2 for the Aerosol Mid Metal Loading (MML) sample and 80 wt % PtRu/SiO2 for the Aerosol High Metal Loading (HML) sample. The molar ration of SiO2:Pt:Ru was 1:0.23:0.23 for the LML sample, 1:0.54:0.54 for the MML sample, and 1:0.78:0.78 for the HML sample. Inert nitrogen gas was used to pass the precursor solution through an aerosol reactor while the temperature was maintained at 125° C. The powder collected on filter paper was then reduced under hydrogen flow at 300° C. for 2 hours. This is followed by removal of the silica template with a 7M KOH solution for 72 hours.

Figure 3A:
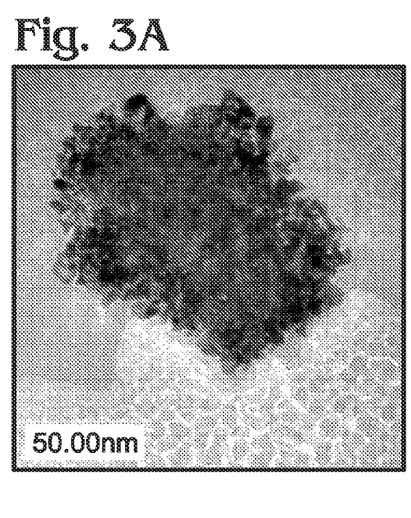
FIG. 3a is a TEM micrograph of an Aerosol LML sample of Pt—Ru network formed using an exemplary method of the present disclosure.
Figure 3B:
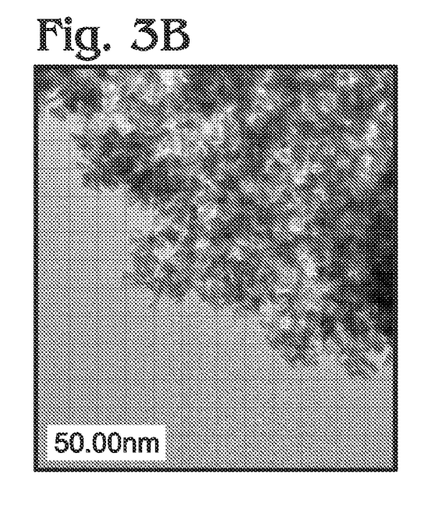
FIG. 3b is a TEM micrograph of an Aerosol MML sample of Pt—Ru network formed using an exemplary method of the present disclosure.
Figure 3C:
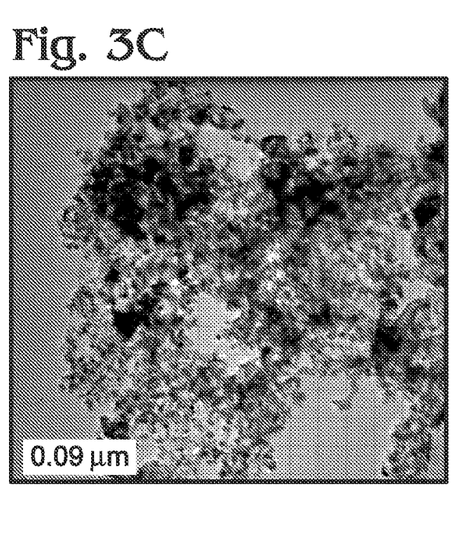
FIG. 3c is a TEM micrograph of an Aerosol HML Pt—Ru network formed using an exemplary method of the present disclosure.
Figure 3D:
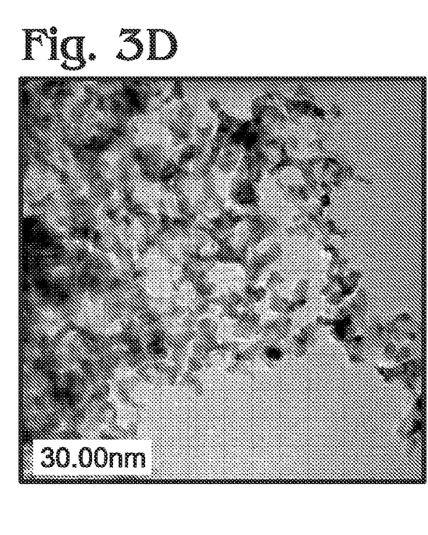
FIG. 3d is a TEM micrograph of an Aerosol HML Pt—Ru network formed using an exemplary method of the present disclosure.

TEM micrographs of the aerosol-derived Pt—Ru materials are shown in FIGS. 3a-3d. FIG. 3a shows a TEM microphotograph of the Aerosol LML Pt—Ru nanocomposites after silica template removal. FIG. 3b shows the Aerosol MML Pt—Ru nanocomposites after silica template removal. FIGS. 3c and 3d show TEM microphotographs of the Aerosol HML sample. The HML sample shows a highly porous, connected Pt—Ru network in which the voids from the 20 nm silica particles are observable. Accordingly, certain formulations of the precursor solution, namely the Aerosol HML sample, formed a less detached network which resulted in more structured nanocomposite with a higher surface area and greater activity. EDS showed the presence of both Pt and Ru and the absence of the silica template for the final material.

Figure 4A:
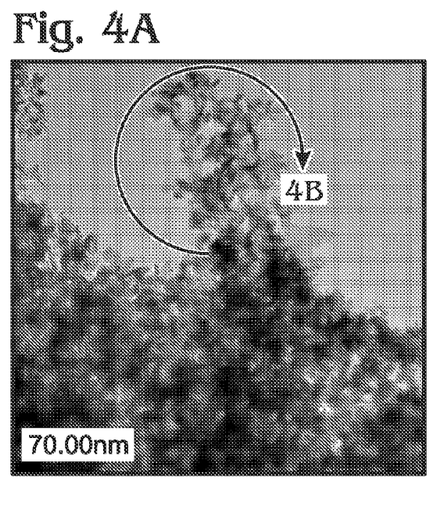
FIG. 4a is another TEM micrograph of an Aerosol HML Pt—Ru network formed using an exemplary method of the present disclosure.
Figure 4B:
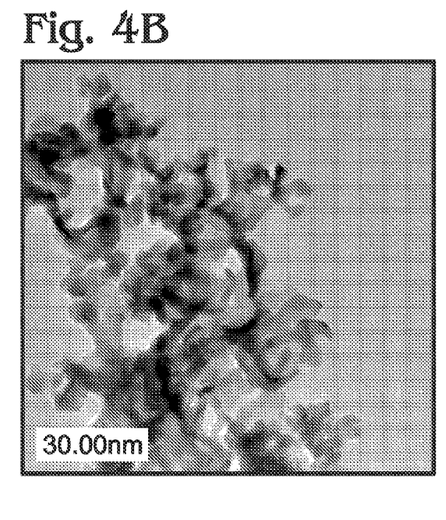

The Aerosol HML precursor formulation exhibited an open frame structure with a high degree of connectivity as shown in FIGS. 4a and 4b. The voids which contained the nm silica colloids are observable. It also showed the highest BET surface area of 50 m2/g compared to the Aerosol LML of 10 m2/g and the Aerosol MML of around 20 m2/g. For comparison, the Pt—Ru black is 60 m2/g while an advanced industrial electrocatalyst for methanol oxidation (commercial 80% Pt—Ru/Carbon Black) has a surface area of 90 m2/g.

Figure 5:
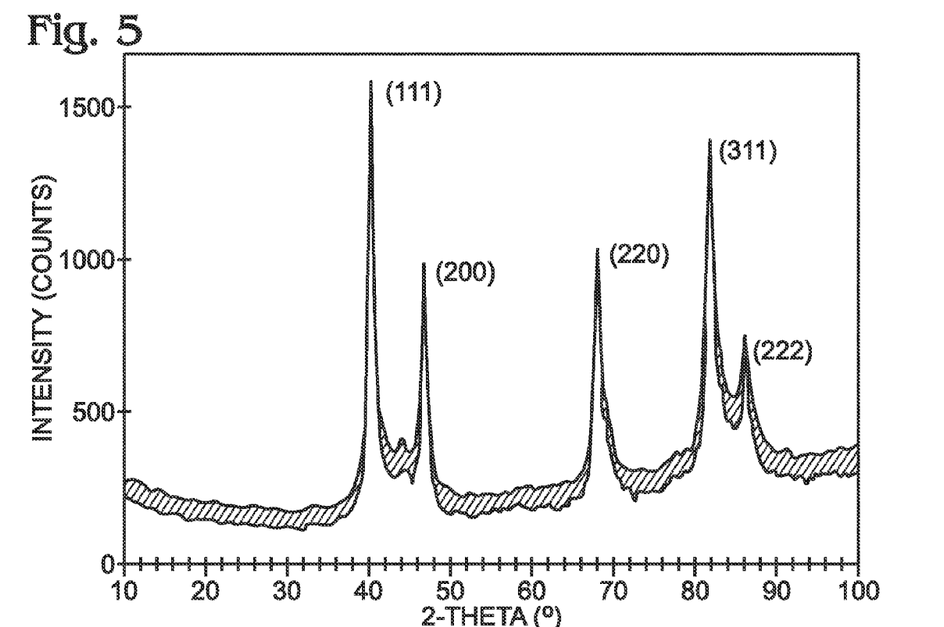
FIG. 5 is an XRD pattern of the Aerosol HML Pt—Ru bimetallic network.

FIG. 5 shows the X-Ray diffraction pattern of the Aerosol HML Pt—Ru nanocomposite. It can be concluded that the electrocatalysts are only composed of face-centered cubic (fcc) Pt—Ru alloy particles because there are no diffraction peaks indicating a presence of pure Ru or Ru-rich hexagonal close-packed (hcp) alloys.

Figure 6:
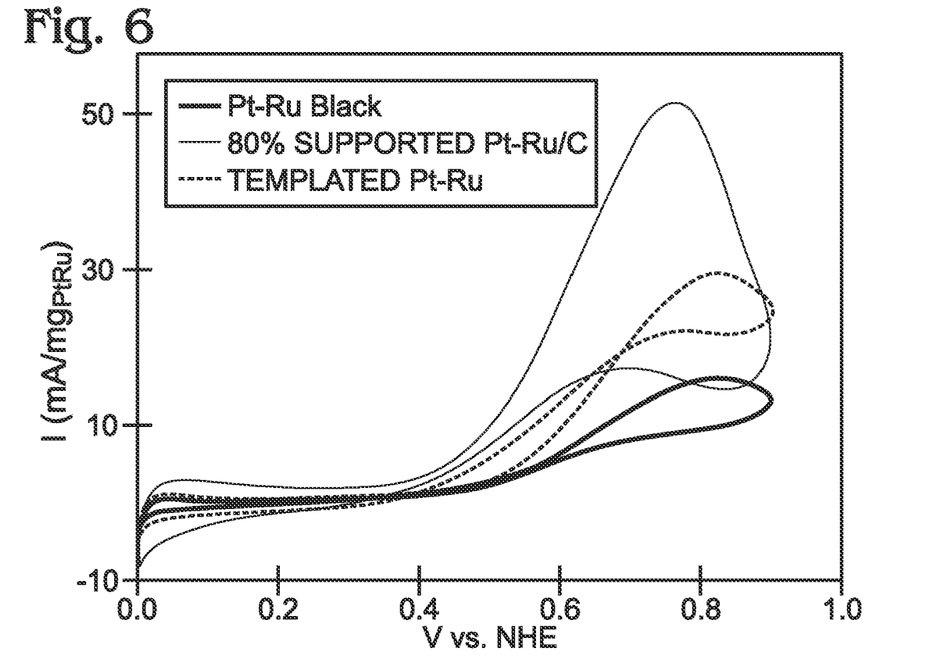
FIG. 6 is cyclic voltammogram of templated Pt—Ru, commercial Pt—Ru Black and Commercial supported 80% Pt—Ru/C normalized to precious metal loading.
Figure 7:
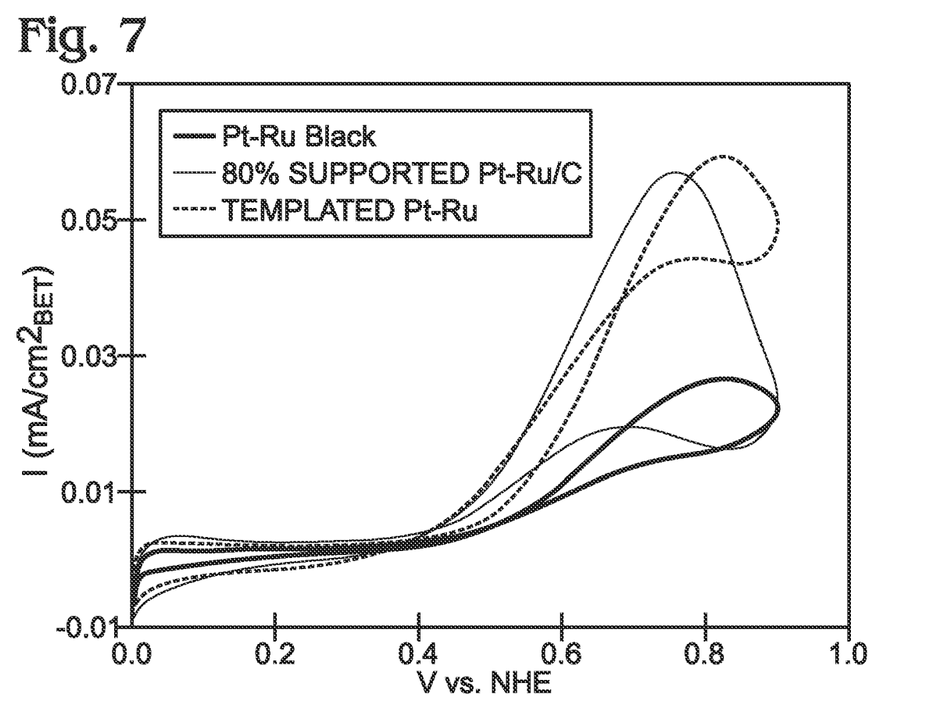
FIG. 7 is cyclic voltammograms of templated Pt—Ru, commercial Pt—Ru Black and Commercial supported 80% Pt—Ru/C normalized to BET surface area.

FIGS. 6 and 7 compare the aerosol-derived templated Pt—Ru to two commercially-available Pt—Ru electrocatalysts by cyclic voltammetry. FIG. 6 shows the current densities normalized to electrocatalyst weight. The templated electrocatalyst has a higher mass activity than commercial Pt—Ru Black which is the most direct comparison because it is also unsupported. For completeness, the activity of a "state-of-the-art" supported 80% Pt—Ru/C electrocatalyst is also plotted in the figures. FIG. 7 shows the current densities normalized to BET surface area. The advantage of the nanostructured Pt—Ru now becomes evident. Despite having a lower surface area than commercial Pt—Ru Black, the open-frame structure results in an electrocatalysts which maximizes the utilization of the metallic phase. In both FIGS. 6 and 7, the scan rate is 10 mV/s in the presence of 3M Methanol and 0.5M H2SO4

Example III

Aerosol Synthesis of Pt—Sn Nanocomposites

Figure 8A:
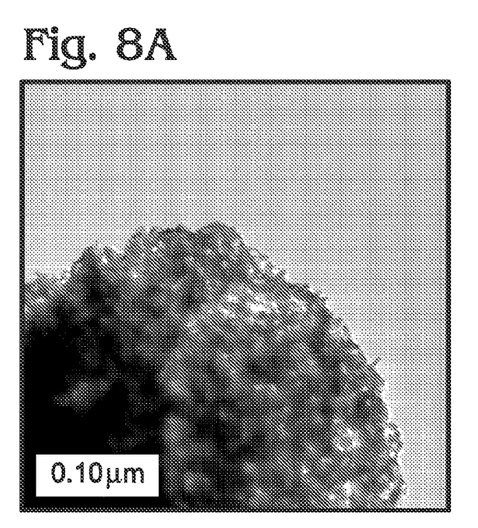
FIG. 8a is a TEM micrograph of an aerosol-derived templated Pt—Sn electrocatalyst at 0.10 µm.
Figure 8B:
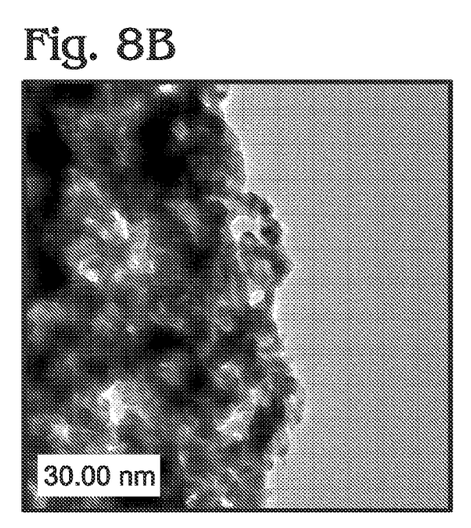
FIG. 8b is a TEM micrograph of an aerosol-derived templated Pt—Sn electrocatalyst at 30.00 nm.

The aerosol synthesis technique described above lends itself quite naturally to the synthesis of nanostructured ethanol oxidation alloys for Direct Ethanol Fuel Cells (DEFCs). Pt—Sn alloys have shown distinct electrocatalytic activity for ethanol oxidation. The precursor solution can be easily modified to include Sn precursors. The most effective electrocatalyst morphology for methanol electro-oxidation can be extended to the synthesis and examination of Pt—Sn electrocatalysts for ethanol electro-oxidation. TEM micrographs of nanostructured Pt—Sn synthesized in the aerosol synthesis method are shown in FIGS. 8a and 8b, which shows the open frame structure resulting after removal of the 20 nm silica template.

Figure 9:
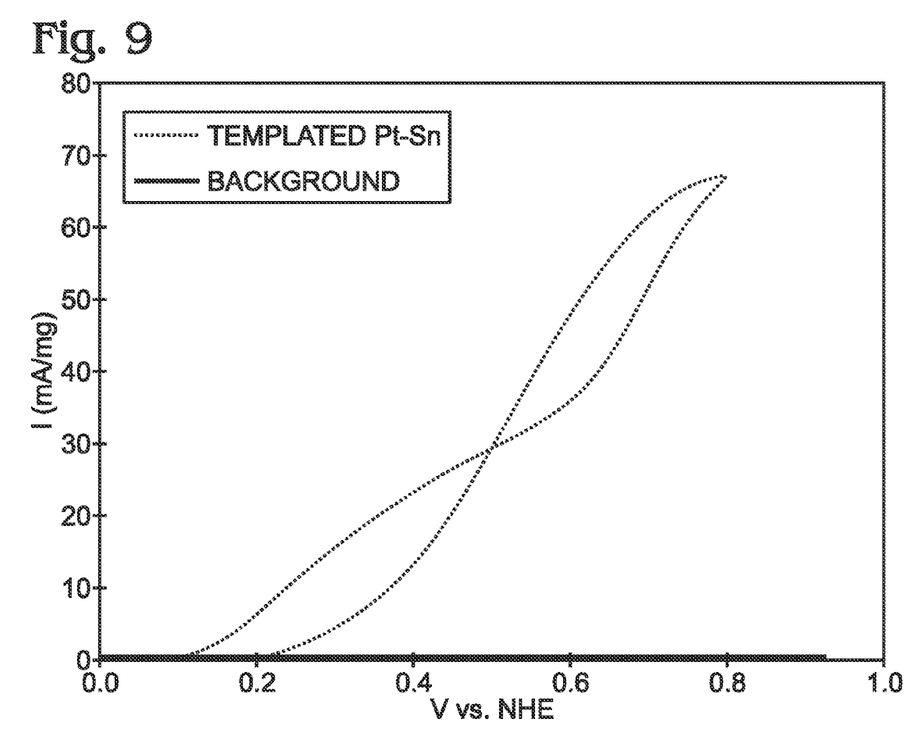
FIG. 9 is a cyclic voltammogram of the templated Pt—Sn electrocatalyst for ethanol oxidation in alkaline media normalized to precious metal loading.

The electrochemical activity of one such aerosol-derived templated Pt—Sn electrocatalyst is shown FIG. 9, which is a Cyclic voltammogram of the templated Pt—Sn electrocatalyst for ethanol oxidation in alkaline media normalized to precious metal loading. The scan rate is 10 mV/s in the presence of 2M Ethanol and 3M KOH. The background scan is taken in the absence of ethanol in solution.

After the addition of ethanol in solution, the cyclic voltammogram shows an onset potential for ethanol oxidation at around 100 mV vs. NHE. This demonstrates the versatility of the synthesis method as well as the potential of these templated materials to develop into high performance electrocatalysts.

Various specific exemplary embodiments are described herein. However, it should be appreciated that actual dimensions and ranges may vary, according to the requirements of the specific apparatus being used and the goals therefore. For example, in some instances, assumptions were made for values, and equations and solutions resulted. However, the assumptions themselves may incorporate a range of acceptable values which in turn lead to different equations and solutions, all of which may be within the scope of the invention. Accordingly, such descriptions should be viewed as exemplary and no limitation inferred unless specifically recited in the claim. Furthermore, numerous papers, publications, and references are identified in the present disclosure. Such papers, publications, references and the like are hereby incorporated by reference.

What is claimed is:

1. A method for manufacturing a material suitable for use as an electrocatalyst, the method comprising:
   atomizing an aqueous solution comprising a solvent, a silica template, and one or more metallic precursors to form droplets;
   evaporating the solvent in the presence of an inert carrier gas to form a powder;
   reducing the powder; and removing the silica template to form a porous metal powder.

2. The method of claim 1 wherein the silica template is in the form of silica spheres.

3. The method of claim 1 wherein the silica spheres have a diameter of between 1 and 100 nm.

4. The method of claim 1 wherein the one or more metallic precursors comprise a platinum precursor.

5. The method of claim 4 wherein the one or more metallic precursors comprise a ruthenium precursor.

6. The method of claim 1 wherein the aqueous solution consists essentially of a silica template, a platinum precursor, and a second, non-platinum, metal precursor.

7. The method of claim 6 wherein the second, non-platinum, metal precursor is ruthenium.

8. The method of claim 6 wherein the second, non-platinum, metal precursor is tin.

9. A highly dispersed unsupported electrocatalyst manufactured by the method of claim 1.

10. The highly dispersed unsupported electrocatalyst of claim 9 comprising platinum and ruthenium.

11. The highly dispersed unsupported electrocatalyst of claim 9 consisting essentially of platinum and ruthenium wherein at least 50% of the platinum and ruthenium is alloyed.

12. The highly dispersed unsupported electrocatalyst of claim 11 wherein at least 75% of the platinum and ruthenium is alloyed.

13. The highly dispersed unsupported electrocatalyst of claim 9 comprising platinum and tin.

14. The highly dispersed unsupported electrocatalyst of claim 9 consisting essentially of platinum and tin.

* * * * *